US011855804B2

United States Patent
Jagadeesan

(10) Patent No.: US 11,855,804 B2
(45) Date of Patent: Dec. 26, 2023

(54) STORAGE-EFFICIENT IMPLEMENTATION OF DOWNSTREAM VXLAN IDENTIFIERS

(71) Applicant: Nvidia Corporation, Santa Clara, CA (US)

(72) Inventor: Suresh Kumar Jagadeesan, Bangalore (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/591,623

(22) Filed: Feb. 3, 2022

(65) Prior Publication Data

US 2022/0417058 A1 Dec. 29, 2022

(30) Foreign Application Priority Data

Jun. 28, 2021 (IN) .............................. 202141028962

(51) Int. Cl.
*H04L 12/46* (2006.01)
*H04L 45/745* (2022.01)
(Continued)

(52) U.S. Cl.
CPC .......... *H04L 12/4633* (2013.01); *H04L 45/24* (2013.01); *H04L 45/745* (2013.01);
(Continued)

(58) Field of Classification Search
CPC ... H04L 12/4633; H04L 45/24; H04L 45/745; H04L 47/825; H04L 63/0272; H04L 63/029
See application file for complete search history.

(56) References Cited

U.S. PATENT DOCUMENTS 11,336,515 B1 * 5/2022 Mehta ..................... H04L 69/22
2006/0182037 A1 * 8/2006 Chen ................... H04L 41/0803
370/254

(Continued)

OTHER PUBLICATIONS

Cisco Systems, Inc., "Cisco Nexus 9000 Series NX-OS VXLAN Configuration Guide, Release 9.3(x), Chapter: Configuring VXLAN BGP EVPN", pp. 1-54 (Year: 2019).*

(Continued)

*Primary Examiner* — Oleg Survillo
*Assistant Examiner* — Monishwar Mohan
(74) *Attorney, Agent, or Firm* — KLIGLER & ASSOCIATES PATENT ATTORNEYS LTD

(57) ABSTRACT

A network device serving as a local VXLAN) Tunnel Endpoint (VTEP) includes a communication interface, a first processor and a packet processor. The communication interface communicates between the local VTEP and remote VTEPs, each VTEP has a respective VXLAN Identifier (VNI). The first processor imports a Downstream-VNI (D-VNI) to be used in forwarding packets from the local VTEP to a remote VTEP, creates a unique egress Routing Interface (RIF) that is translatable into the imported D-VNI, and associates the unique egress RIF with one or more route entries in the local VTEP. The packet processor receives a packet destined to the remote VTEP, looks up the packet in the route entries in the local VTEP to retrieve the unique egress RIF, translates the unique egress RIF into the imported D-VNI, encapsulates the packet with the imported D-VNI, and forwards the encapsulated packet in accordance with the unique egress RIF.

38 Claims, 6 Drawing Sheets

(51) Int. Cl.
 *H04L 9/40* (2022.01)
 *H04L 47/70* (2022.01)
 *H04L 45/24* (2022.01)
(52) U.S. Cl.
 CPC .......... *H04L 47/825* (2013.01); *H04L 63/029* (2013.01); *H04L 63/0272* (2013.01)

(56) References Cited

U.S. PATENT DOCUMENTS

| | | | | |
|---|---|---|---|---|
| 2016/0134520 | A1* | 5/2016 | Kapadia | H04L 45/50 370/392 |
| 2017/0317919 | A1* | 11/2017 | Fernando | H04L 41/40 |
| 2018/0069792 | A1* | 3/2018 | Gao | H04L 45/745 |
| 2018/0302410 | A1* | 10/2018 | Venkataraman | H04L 63/0263 |
| 2020/0153784 | A1* | 5/2020 | Semwal | H04L 61/103 |
| 2021/0226910 | A1* | 7/2021 | Ranpise | H04L 12/4633 |

OTHER PUBLICATIONS

Mahalingam et al., "Virtual eXtensible Local Area Network (VXLAN): A Framework for Overlaying Virtualized Layer 2 Networks over Layer 3 Networks," Request for Comments 7348, Independent Submission (Year: 2014).*

Varanasy, "Cisco NX-OS VXLAN Innovations Part 1: Inter-VNI Communication Using Downstream VNI," Cisco Blogs, pp. 1-9, Aug. 24, 2020, as downloaded from https://blogs.cisco.com/datacenter/cisco-nx-os-vxlan-innovations-part-1-inter-vni-communication-using-downstream-vni.

Cisco Systems, Inc., "Cisco Nexus 9000 Series NX-OS VXLAN Configuration Guide, Release 9.3(x), Chapter: Configuring VXLAN BGP EVPN", pp. 1-54, Jul. 20, 2019.

Mahalingam et al., "Virtual extensible Local Area Network (VXLAN): A Framework for Overlaying Virtualized Layer 2 Networks over Layer 3 Networks," Request for Comments 7348, Independent Submission, pp. 1-22, Aug. 2014.

Sajassi et al., "A Network Virtualization Overlay Solution Using Ethernet VPN (EVPN)," Request for Comments 8365, Internet Engineering Task Force (IETF), pp. 1-33, Mar. 2018.

* cited by examiner

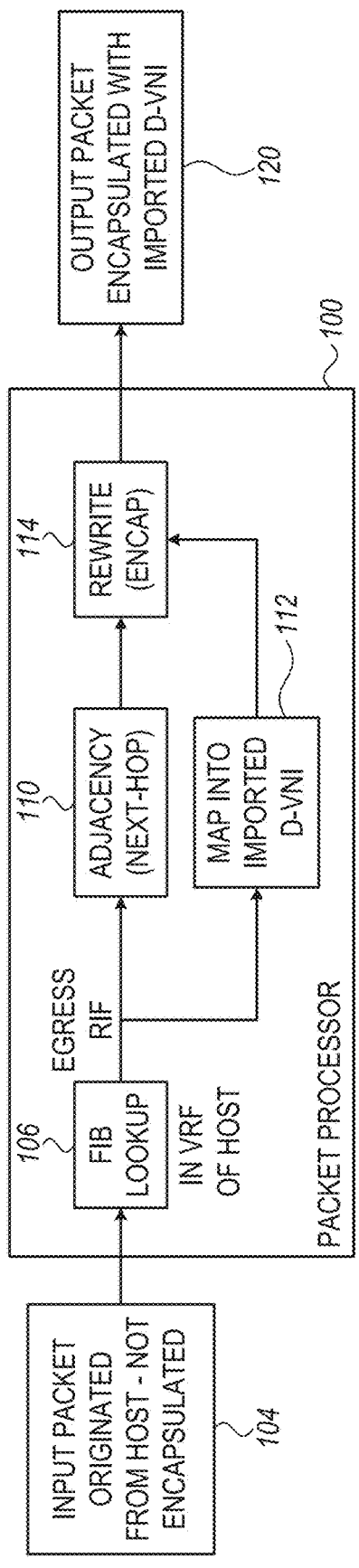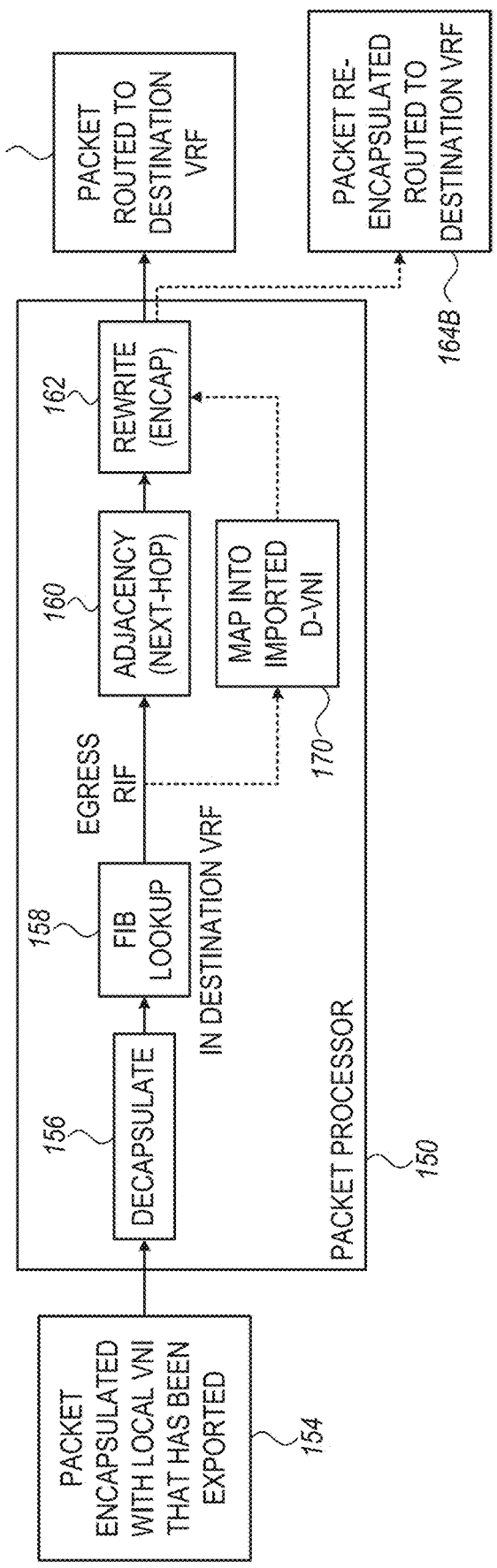

STORAGE-EFFICIENT IMPLEMENTATION OF DOWNSTREAM VXLAN IDENTIFIERS

TECHNICAL FIELD

Embodiments described herein relate generally to data communication, and particularly to methods and systems for storage-efficient implementation of Downstream VXLAN Identifiers (D-VNIs).

BACKGROUND

Virtual Extensible Local Area Network (VXLAN) is a network virtualization technology suitable for large scale deployments such as cloud computing and data centers. VXLAN uses a VLAN-like encapsulation technique. VXLAN is described, for example, in a Request For Comments (RFC) 7348.

Ethernet Virtual Private Network (EVPN) is a control plane for VXLAN, allowing for building and deploying large scale VXLAN-based networks. EVPN is specified, for example, in RFC 8365.

VRF is a technology in which multiple independent forwarding tables reside in the same network device (e.g., a router or switch). A forwarding table in each VRF instance is used to designate the next hop for each data packet, as well as a set of rules and routing protocols that govern how the packet is to be forwarded. Because the VRF routing instances are independent, the same or overlapping IP addresses can be used in different instances without conflicting with one another, and network paths can be segmented without requiring multiple routers. Moreover, because the traffic is automatically segregated, VRF also increases network security and can mitigate the need for encryption and authentication.

SUMMARY

An embodiment that is described herein provides a network device serving as a local Virtual Extensible Local Area Network (VXLAN) Tunnel Endpoint (VTEP), the network device including a communication interface, a first processor and a packet processor. The communication interface communicates between local Virtual Routing and Forwarding domains (VRFs) and remote VRFs, each of the local VRFs and each of the remote VRFs has a unique VXLAN Identifier (VNI). The first processor running a control program that creates a local VRF instance for a local VRF that is provisioned in the local VTEP, imports a Downstream-VNI (D-VNI) to be used in forwarding packets from the local VRF to a remote VRF provisioned in a remote VTEP but not in the local VTEP, creates a unique egress Routing Interface (RIF) that is translatable into the imported D-VNI, and associates the unique egress RIF with one or more route entries in the local VRF instance. The packet processor receives a packet destined to the remote VRF, looks up the packet in the one or more route entries in the local VRF instance to retrieve the unique egress RIF, translates the unique egress RIF into the imported D-VNI, encapsulates the packet with the imported D-VNI, and forwards the encapsulated packet in accordance with the unique egress RIF.

In some embodiments, the control program in the local VTEP exports a local VNI of the local VRF to the remote VTEP, to be used by the remote VTEP in forwarding packets from the remote VRF to the local VRF. The control program further creates a second egress RIF for the local VNI, and associates the second egress RIF with one or more second route entries in the local VRF instance. The packet processor receives from the remote VRF, via the communication interface, a second packet destined to the local VRF, the second packet is encapsulated by the remote VTEP with the exported local VNI, decapsulates the second packet, looks up the decapsulated packet in the one or more second route entries in the local VRF instance for retrieving the second egress RIF, and forwards the second packet in accordance with the second egress RIF. In other embodiments, the local VTEP and the remote VTEP are included in an Ethernet Virtual Private Network (EVPN) in which packets communicated between different VRFs are encapsulated based on VXLAN encapsulation. In yet other embodiments, the control program imports the D-VNI using an instance of a Border Gateway Protocol (BGP) associated with the local VRF.

In an embodiment, the control program associates the unique egress RIF with multiple route entries that respectively belong to multiple VRF instances created respectively for multiple local VRFs provisioned in the local VTEP. In another embodiment, the control program provisions the one or more route entries in forwarding rules in an Access Control List (ACL), and the packet processor looks up the packet by matching the packet to one of the forwarding rules in the ACL. In yet another embodiment, each of the local VTEP and the remote VTEP includes a leaf network device or a service network device in the communication network, each of the leaf network devices is assigned one or more local VRFs, and each of the service network devices is assigned one or more remote VRFs that are different from the local VRFs.

In some embodiments, a serving host is coupled to a given service network device on which a corresponding shared-service VRF is provisioned, the serving host providing a service to one or more served hosts in the local VRFs over the communication network. In other embodiments, the communication network having a hub-spoke topology, in which one or more hub network devices are provisioned with a hub VRF supporting routing between served hosts belonging to different VRFs among the local VRFs. In yet other embodiments, the communication network supports an Equal-Cost Multi-Path (ECMP) routing protocol, and the packet processor encapsulates packets forwarded to multiple remote VTEPs using different ECMP paths, with different respective D-VNIs.

In an embodiment, the packet processor receives the packet from a host or a network element in the first VRF, or from a third VRF. In another embodiment, the control program imports the D-VNI from the remote VTEP, or by receiving the D-VNI in one or more commands sent by a user manually, or automatically by running a script containing the one or more commands.

There is additionally provided, in accordance with an embodiment that is described herein, a method for data communication, including, in a network device serving as a local Virtual Extensible Local Area Network (VXLAN) Tunnel Endpoint (VTEP), communicating between local Virtual Routing and Forwarding domains (VRFs) and remote VRFs, each of the local VRFs and each of the remote VRFs has a unique VXLAN Identifier (VNI). A local VRF instance is created by a control program for a local VRF that is provisioned in the local VTEP. A Downstream-VNI (D-VNI) is imported, to be used in forwarding packets from the local VRF to a remote VRF provisioned in the remote VTEP but not in the local VTEP. A unique egress Routing Interface (RIF) that is translatable into the imported D-VNI is created, and the unique egress RIF is associated with one or more route entries in the local VRF instance. A packet destined to the remote VRF is received by a packet processor of the local VTEP. The packet is looked up in the one or more route entries in the local VRF instance to retrieve the unique egress RIF. The unique egress RIF is translated into the imported D-VNI, and the packet is encapsulated with the imported D-VNI. The encapsulated packet is forwarded in accordance with the unique egress RIF.

There is additionally provided, in accordance with an embodiment that is described herein, a network device serving as a local Virtual Extensible Local Area Network (VXLAN) Tunnel Endpoint (VTEP), the network device includes a communication interface, a first processor and a packet processor. The communication interface communicates with one or more remote VTEPs, the local VTEP and the one or more remote VTEPs are assigned respective VXLAN Identifiers (VNIs). The first processor running a control program, the control program imports a Downstream-VNI (D-VNI) to be used in forwarding packets from the local VTEP to a remote VTEP, creates a unique egress Routing Interface (RIF) that is translatable into the imported D-VNI, and associates the unique egress RIF with one or more route entries in the local VTEP. The packet processor receives a packet destined to the remote VTEP, looks up the packet in the one or more route entries in the local VTEP to retrieve the unique egress RIF, translates the unique egress RIF into the imported D-VNI, encapsulates the packet with the imported D-VNI, and forwards the encapsulated packet in accordance with the unique egress RIF.

In some embodiments, the control program exports a local VNI of the local VTEP to the remote VTEP, to be used by the remote VTEP in forwarding packets from the remote VTEP to the local VTEP. The control program further creates a second egress RIF for the local VNI, and associates the second egress RIF with one or more second route entries in the local VTEP. The packet processor receives from the remote VTEP, via the communication interface, a second packet destined to the local VTEP, the second packet is encapsulated by the remote VTEP with the exported local VNI, decapsulates the second packet, looks up the decapsulated packet in the one or more second route entries for retrieving the second egress RIF, and forwards the second packet in accordance with the second egress RIF. In other embodiments, the local VTEP and the one or more remote VTEPs belong to different respective sites in a multi-site topology. In yet other embodiments, the local VTEP serves as a Border Gateway (BGW) VTEP and the one or more remote VTEPs serve as leaf VTEPs coupled to hosts, the BGW VTEP and the hosts are assigned a common Virtual Routing and Forwarding domain (VRF).

In an embodiment, the local VTEP and the remote VTEP are assigned different respective VNIs. In another embodiment, the network device is included in a communication network including multiple interconnected network devices, and the network device serves as a leaf VTEP or a BGW VTEP in the communication network.

There is additionally provided, in accordance with an embodiment that is described herein, a method for data communication, including, in a network device serving as a local Virtual Extensible Local Area Network (VXLAN) Tunnel Endpoint (VTEP), communicating with one or more remote VTEPs, the local VTEP and the one or more remote VTEPs ae assigned respective VXLAN Identifiers (VNIs). A Downstream-VNI (D-VNI) is imported by a control program running on the local VTEP, to be used in forwarding packets from the local VTEP to a remote VTEP. A unique egress Routing Interface (RIF) that is translatable into the imported D-VNI is created, and the unique egress RIF is associated with one or more route entries in the local VTEP. A packet destined to the remote VTEP is received by a packet processor of the local VTEP. The packet is looked up in the one or more route entries in the local VTEP to retrieve the unique egress RIF. The unique egress RIF is translated into the imported D-VNI, and the packet is encapsulated with the imported D-VNI. The encapsulated packet is forwarded in accordance with the unique egress RIF.

There is additionally provided, in accordance with an embodiment that is described herein, a method for communication between Virtual Routing and Forwarding domains (VRFs), the method including, communicating between a local VRF provisioned in a local VXLAN Tunnel Endpoint (VTEP) and a remote VRF provisioned in a remote VTEP but not in the local VTEP. A Downstream VXLAN Identifier (D-VNI) associated with the remote VRF is imported by the local VTEP, to be used in forwarding packets from the local VRF to the remote VRF, and a unique egress Routing Interface (RIF) that is translatable into the imported D-VNI is created. Upon receiving, by the local VTEP, a packet destined to the remote VRF, the unique egress RIF retrieved based on the packet is translated into the imported D-VNI, and the packet is encapsulated with the imported D-VNI. The encapsulated packet is forwarded in accordance with the unique egress RIF.

There is additionally provided, in accordance with an embodiment that is described herein, a method for communication between sites of different routing domains, the method including, communicating between a local VXLAN Tunnel Endpoint (VTEP) and a remote VTEP belonging to different respective routing domains. A Downstream-VNI (D-VNI) is imported by the local VTEP, to be used in forwarding packets from the local VTEP to the remote VTEP, and a unique egress Routing Interface (RIF) that is translatable into the imported D-VNI is created. Upon receiving, by the local VTEP, a packet destined to the remote VTEP, the unique egress RIF retrieved based on the packet is translated into the imported D-VNI, and the packet is encapsulated with the imported D-VNI. The encapsulated packet is forwarded in accordance with the unique egress RIF.

These and other embodiments will be more fully understood from the following detailed description of the embodiments thereof, taken together with the drawings in which:

BRIEF DESCRIPTION OF THE DRAWINGS

FIGS. 3A and 3B are diagrams that schematically illustrate VTEP processing and forwarding applied to non-encapsulated and encapsulated packets, in accordance with embodiments that is described herein;

DETAILED DESCRIPTION OF EMBODIMENTS

Overview

Figure 1:
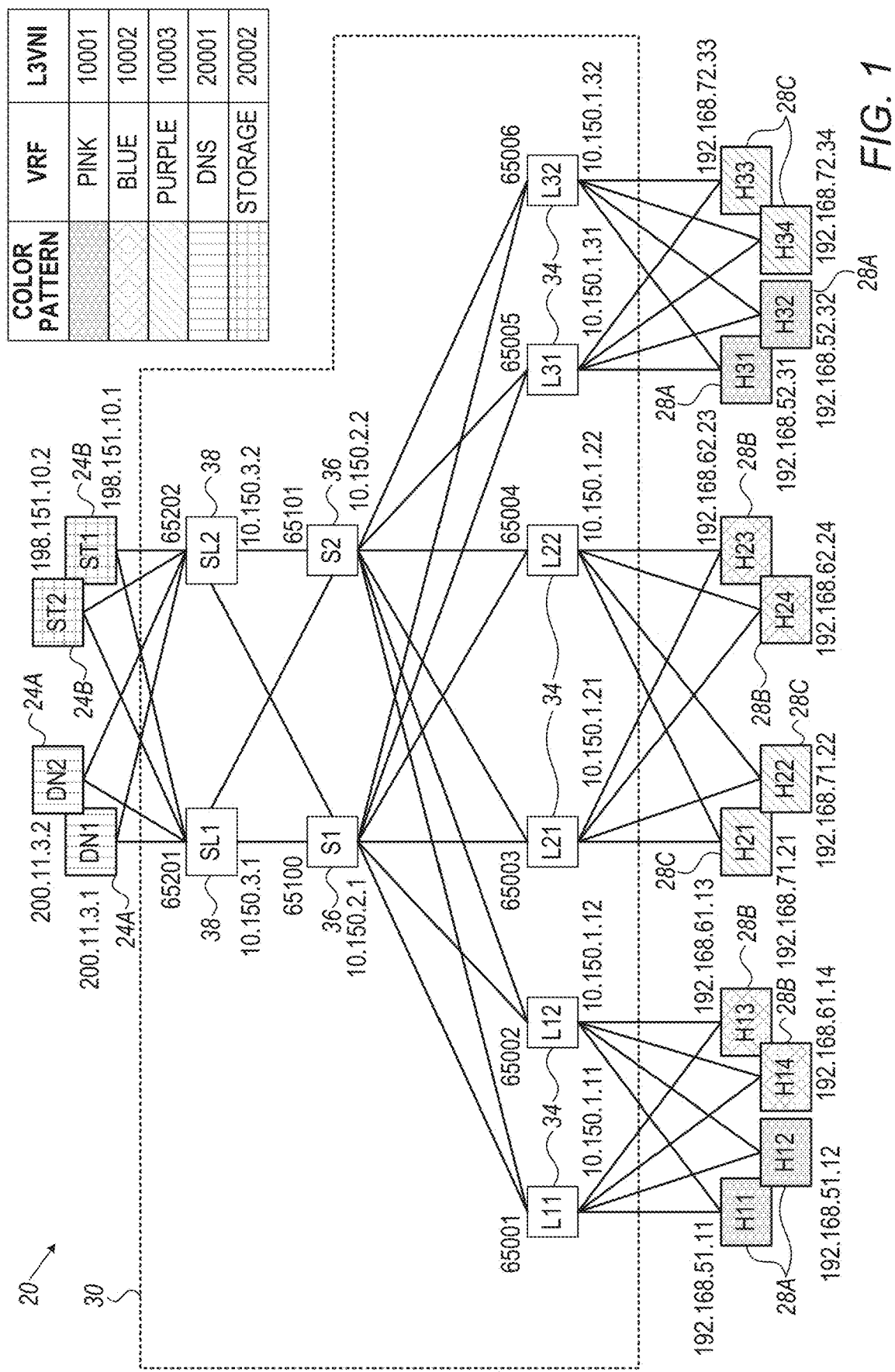
FIG. 1 is a block diagram that schematically illustrates a computer system providing shared services, in accordance with an embodiment that is described herein.

Embodiments that are described herein provide improved methods and systems for Virtual Extensible Local Area Network (VXLAN) tunneling with Downstream VXLAN Identifier (D-VNIs) encapsulation across different routing domains.

Various communication networks are divided into multiple routing domains that are typically isolated from one another, e.g., for security reasons. With isolated routing domains, traffic is allowed to flow within each routing domain but not between different routing domains. Routing domains may be associated, for example, with sites in a multi-site computer system, or Virtual Routing and Forwarding domains (VRFs).

Network devices that support VXLAN are referred to as Virtual Tunnel Endpoints (VTEPs). VTEPs encapsulate VXLAN traffic and de-encapsulate that traffic when it leaves the VXLAN tunnel.

In VXLAN, each VXLAN tunnel is typically assigned a unique Open Systems Interconnection (OSI) Layer-three (L3) VXLAN Identifier (VNI). In the description that follows, the term "L3VNI" is also referred to simply as "VNI" for brevity. VNIs may be assigned in the communication network in various ways. For example, in a multi-VRF configuration, different VRFs are typically assigned different respective VNIs, and in a multi-site configuration, network devices belonging to a common site may be assigned same or different VNIs. The different sites typically belong to different administrative domains.

In some applications, the communication network needs to support communication between different routing domains associated with respective sites or VRFs, for example. Inter-domain communication may be achieved, for example, by importing and exporting certain VNIs between the different routing domains. A VNI imported from another routing domain for establishing a VXLAN tunnel is referred to as a "Downstream-VNI" (D-VNI).

In some embodiments, packet forwarding in a network device is based on pre-sorted route entries, wherein each route entry is associated with a respective egress Router Interface (RIF). In principle, route entries related to inter-domain VXLAN tunnels could store explicit D-VNI information for the imported D-VNIs. This approach, however, would typically be costly or even infeasible, because storing explicit D-VNI information over a large number of route entries may amount to a significant storage space. For example, assuming 10 bytes of D-VNI information per a route entry, the storage space over 10,000 route entries amounts to 100 Kbytes. As another requirement, e.g., in hardware implementation, is that the hardware is required to support the storage of explicit D-VNI information within route entries.

In some embodiments, an efficient scheme for supporting VXLAN encapsulation with D-VNIs is provided. In the efficient scheme, unique egress RIFs are created for respective imported D-VNIs, and are associated with relevant route entries.

Consider an embodiment of a network device serving as a local Virtual Extensible Local Area Network (VXLAN) Tunnel Endpoint (VTEP), e.g., in a multi-site computer system. The network device includes a communication interface, a first processor and a packet processor. The communication interface communicates with one or more remote VTEPs, wherein the local VTEP and the one or more remote VTEPs are assigned respective VXLAN Identifiers (VNIs). The first processor running a control program that imports (e.g., from the remote VTEP or from a user) a Downstream-VNI (D-VNI) to be used in forwarding packets from the local VTEP to the remote VTEP, creates a unique egress Routing Interface (RIF) that is translatable into the imported D-VNI, and associates the unique egress RIF with one or more route entries in the local VTEP. The packet processor receives a packet destined to the remote VTEP, looks up the packet in the one or more route entries in the local VTEP to retrieve the unique egress RIF, translates the unique egress RIF into the imported D-VNI, encapsulates the packet with the imported D-VNI, and forwards the encapsulated packet in accordance with the unique egress RIF.

In some embodiments, the control program exports a local VNI of the local VTEP to the remote VTEP, to be used by the remote VTEP in forwarding packets from the remote VTEP to the local VTEP, creates an egress RIF for the local VNI, and associates this egress RIF with one or more second route entries in the local VTEP. In response to receiving from the remote VTEP, via the communication interface, a second packet that is encapsulated by the remote VTEP with the exported local VNI and that is destined to the local VTEP, the packet processor decapsulates the second packet, looks up the decapsulated packet in the one or more second route entries for retrieving the second egress RIF, and forwards the second packet in accordance with the second egress RIF.

In some embodiments, the local VTEP and the one or more remote VTEPs belong to different respective sites in a multi-site topology, e.g., a multi-site data center. In some embodiments, the local VTEP serves as a Border Gateway (BGW) VTEP and the one or more remote VTEPs serve as leaf VTEPs coupled to hosts, wherein the BGW VTEP and the hosts are assigned a common VRF.

In the disclosed techniques, a low-storage scheme for supporting VXLAN tunnels with D-VNIs is provided. To this end, unique RIFs are created for respective imported D-VNIs and are associated with relevant route entries. Each of the unique egress RIFs may be associated with multiple route entries but is typically stored in the network device only once, regardless of the number of VRFs provisioned in that network device. Since the number of imported D-VNIs is typically relatively small, the unique egress RIFs consume very little storage space.

The disclosed low-storage scheme may be used in various applications, including (but not limited to) a multi-VRF communication system providing shared-services, a multi-VRF communication system having a hub-spoke topology, and a multi-site communication system.

System Description

FIG. 1 is a block diagram that schematically illustrates a computer system 20 providing shared services, in accordance with an embodiment that is described herein.

Computer system 20 comprises serving hosts 24A and 24B providing services to hosts 28A, 28B and 28C over a communication network 30. Communication network 30 may comprise, for example, an Ethernet network.

Serving hosts 24A and 24B belong to routing domains specified by a Domain Name System (DNS) VRF and a STORAGE VRF, which are assigned respective VNI values 20001 and 20002. Hosts 28A, 28B and 28C belong to different routing domains specified by respective VRFs denoted PINK, BLUE and PURPLE, which are assigned respective VNI values 10001, 10002 and 10003.

In the present example, each of hosts 28A, 28B and 28C receives DNS services from DNS hosts 24A denoted DN1 and DN2, and storage services from storage hosts 24B denoted ST1 and ST2. In other embodiments, other types of services and/or other numbers of service types can also be used.

Communication network 30 comprises multiple interconnected network devices such as leaf switches 34 denoted L11 . . . L32, spine switches 36 denoted S1 and S2, and service leaf switches 38 denoted SL1 and SL2. A service leaf switch 34 is also referred to herein as a "service switch" for brevity.

In the description that follows, a leaf switch comprises a switch to which are coupled one or more hosts, directly or indirectly. The hosts may comprise, for example, physical servers, and/or virtual-machines or servers in a virtualized data-center environment.

Leaf switches 34 are coupled to hosts 28A, 28B and 28C on one side and to spine switches 36 on the other side. For example, leaf switch L11 is coupled to hosts 28A denoted H11 and H12 of the PINK VRF, and to hosts 28B denoted H13 and H14 of the BLUE VRF. Service switches SL1 and SL2 are coupled to DNS hosts DN1 and DN2 and storage hosts ST1 and ST2 on one side, and to spine switches 36 on the other side.

In computer system 20, the leaf, spine and service switches are assigned respective Autonomous System Numbers (ASNs). Specifically, leaf switches L11 . . . L32 are assigned ASNs 65001 . . . 65006, spine switches S1 and S2 are assigned respective ASNs 65100 and 65101, and service switches SL1 and SL2 are assigned respective ASNs 65201 and 65202. ASNs may be used, for example, in specifying Route Targets (RTs) as will be described below.

In some embodiments, communication network 30 comprises an Ethernet Virtual Private Network (EVPN), in which at least some of the network devices serve as VXLAN Virtual Tunnel Endpoints (VTEPs). In the description that follows the terms "network device", "switch", "router", "gateway" and "VTEP" are used interchangeably.

In some embodiments, a network device serving as a VTEP typically creates VRF instances for respective VRFs provisioned in that VTEP. In the present example, each of leaf VTEPs L11 . . . L32 is provisioned with two VRFs among the PINK, BLUE and PURPLE VRFs, depending on the VRFs of the hosts coupled to the leaf switch. Similarly, each of service VTEPs SL1 and SL2 creates respective VRF instances for its provisioned VRFs, e.g., the DNS and STORAGE VRFs, in this example.

In some embodiments, communication network 30 is required to support VXLAN tunneling between different VRFs provisioned in different VTEPs. To this end, the VTEPs may establish inter-VRF VXLAN tunnels by exchanging with one another VNIs associated with the different VRFs.

In the service to host direction, each of service VTEPs SL1 and SL2 imports from each leaf VTEP a D-VNI per each VRF provisioned in the leaf VTEP. The service VTEP then encapsulates packets destined to a given VRF in a leaf VTEP with the D-VNI imported from the leaf VTEP for the given VRF. In the host to service direction, each leaf VTEP among L11 . . . L32 imports D-VNIs from each of service VTEPs SL1 and SL2. In the present example, a leaf VTEP imports from a service VTEP two D-VNIs corresponding to the DNS and STORAGE VRFs. The leaf VTEP then encapsulates packets destined to a given VRF in a service VTEP with the D-VNI imported from the service VTEP for the given VRF.

As noted above, the VRFs provisioned in a VTEP have respective forwarding tables comprising route entries. Each route entry is associated with (e.g., points to) a respective egress RIF, which the VTEP uses for packet forwarding. In some embodiments, the VTEP creates a unique egress RIF for each imported D-VNI and associates the unique egress RIF with relevant route entries in the VRFs provisioned in the VTEP.

In some embodiments, communication network 30 supports communication between different VRFs in different leaf VTEPs using VXLAN encapsulation with D-VNIs. For example, L11 may import for its PINK VRF, from L21, L22, L31 and/or L32 a D-VNI associated with the PURPLE VRF. L11 creates a unique RIF for the imported D-VNI and associates this unique egress RIF with route entries destined to the PURPLE VRF via one of L21 . . . L32, in the local PINK VRF instance. L1*l* then uses the imported D-VNI, e.g., for encapsulating packets that H11 sends to H22, e.g., via L11, S1 and L22.

In some embodiments, the control program in the network device imports and exports routes using Route Targets (RTs). A RT is a construct used in the BGP protocol to specify and control the route import/export direction and content. In some embodiments, RTs are used to control the import and export of routes/VNIs between VTEPs.

In some embodiments, a VRF instance in a VTEP comprises an import RT list and an export RT list. The RTs in the export list are attached to every route that the VTEP advertises to other VTEPs. Upon receiving, by a remote VTEP, an advertised route with attached RTs, the remote VTEP compares the RTs against the import lists defined in its respective VRF instances. If any of the attached RTs matches the import list of a VRF instance, the remote VTEP imports the advertised route into that VRF instance. When none of the RTs attached to the advertised route matches the import list of the VRF instance, the remote VTEP omits importing the advertised route into that VRF instance.

In some embodiments, access to shared services in computer system 20 using VXLAN tunneling with D-VNIs, involves the following stages:

Each of leaf VTEPs L11 . . . L32 imports for each of its provisioned VRFs (e.g., among the PINK, BLUE and PURPLE VRFs) RTs with which service VTEPs SL1 and SL2 export routes corresponding to their shared services VRFs. For example, in case the service VTEPs export auto-derived RTs, the leaf VTEPs import RTs *:20001 and *:20002. The wildcard symbol '*' in these RTs refers to the Autonomous System Numbers (ASNs) 65201 and 65202 respectively assigned to SL1 and SL2. Alternatively, the RTs may be specified with explicit ASNs rather than using wildcard notation.

Each of SL1 and SL2 imports for its provisioned VRFs (DNS and STORAGE VRFs) RTs announced by the leaf VTEPs for the PINK, BLUE and PURPLE VRFs. In the present example, each of SL1 and SL2 imports RTs *:10001, *:10002 and *:10003. Alternatively, explicit ASNs of the leaf VTEPs can be used in the RTs instead of wildcard notation.

Based on the imported routes, the leaf VTEP creates unique egress RIFs for respective D-VNIs 20001 and 20002. The leaf VTEP further associates these unique egress RIFs with route entries destined to the DNS and storage hosts, in routing tables of the VRFs provisioned in the leaf VTEP.

Based on the imported routes from the leaf VTEPs, each of SL1 and SL2 creates unique egress RIFs for respective D-VNIs 10001, 10002 and 10003. The service VTEP further associates these unique egress RIFs with route entries destined to hosts H11 . . . H34, in respective routing tables of the DNS and STORAGE VRFs.

Consider a packet sent from a source host, e.g., H11 (IP 192.168.51.11) to a DNS host e.g., DN1 (IP 200.11.3.1). A leaf VTEP (L11 or L12) receives the packet from H1*l*, encapsulates the packet with D-VNI 20001, and tunnels the encapsulated packet to SL1 (IP 10.150.3.1) or SL2 (IP 10.150.3.2). SL1 or SL2 decapsulate the packet, and based on the D-VNI (20001) in the received packet routes the decapsulated packet to DN1 in the destination DNS VRF. SL1 or SL2 performs this last routing by selecting the routing table of the DNS VRF based on the D-VNI in the received packet. In the opposite direction, SL1 or SL2 receives a packet from host DN1 and encapsulates the packet with D-VNI 10001 of the PINK VRF to which H11 belongs. SL1 or SL2 tunnels the encapsulated packet to L11 or L12, which decapsulates the packet and routes the decapsulated packet using the routing table of the PINK VRF.

In some embodiments, a leaf VTEP 34 or a service VTEP 38 connects to local hosts using a Multi-chassis Link Aggregation (MLAG) configuration. In such embodiments, peer VTEPs appear to a host bond as a single logical network device. For example, leaf VTEPs L11 and L12 may be configured as MLAG peers for each of hosts H11, H12, H13 and H14. Similarly, service VTEPs SL1 and SL2 may be configured as MLAG peers for each of serving hosts DN1, DN2, ST1 and ST2.

In some embodiments, communication network 30 supports an Equal-Cost Multi-Path (ECMP) routing protocol. In general, the ECMP may be used for fast failover recovery. ECMP is applicable, for example, in an EVPN Multihoming (MH) configuration, e.g., in data centers having a Clos network topology. In ECMP, a source VTEP forwards packets to multiple destination VTEPs via multiple respective ECMP paths, wherein the source VTEP encapsulates packets forwarded via different ECMP paths, with different respective D-VNIs.

A Network Device Serving as a VTEP

Figure 2:
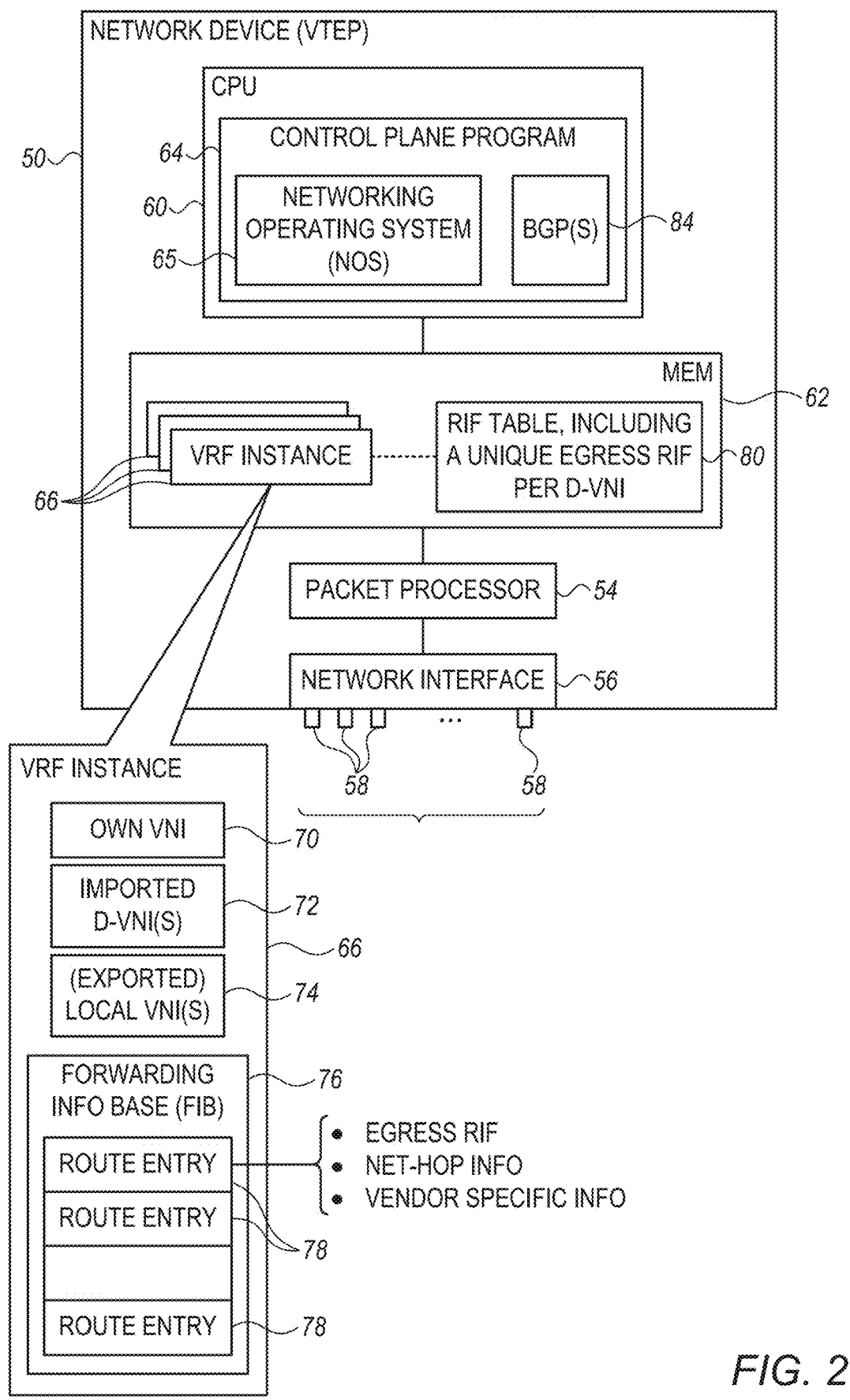
FIG. 2 is a block diagram that schematically illustrates a network device serving as a Virtual Tunnel Endpoint (VTEP), in accordance with an embodiment that is described herein.

FIG. 2 is a block diagram that schematically illustrates a network device 50 serving as a Virtual Tunnel Endpoint (VTEP), in accordance with an embodiment that is described herein. Network device 50 may be used, for example, in implementing leaf VTEPs L11 . . . L32 and service VTEPs SL1 and SL2 in computer system 20 of FIG. 1, as well as leaf VTEPs L11 . . . L22 and hub VTEPs SL1 and SL2 in computer system 300 of FIG. 5 below.

Network device 50 comprises a packet processor 54 coupled to a network interface 56 that connects to a communication network (e.g., communication network 30 of FIG. 1) using ports 58. Each port 58 may function as an input port for incoming packets, an output port for outgoing packets, or a combined port for both incoming and outgoing packets. Packet processor 54 typically handles real time packet processing and forwarding.

Network device 50 further comprises a general processor 60 such as, for example, a Central processing Unit (CPU), and a memory 62 that is accessible by both CPU 60 and packet processor 54. CPU 60 runs a control plane program 64 that handles offline control and provisioning tasks of the network device. In some embodiments, control plane program 64 (or part thereof) comprises a Networking Operating System (NOS) 65 such as the Nvidia® Cumulus Linux NOS, for example. Control plane program 64 is also referred to herein simply as a "control program" for brevity.

In some embodiments, control program 64 creates one or more VRF instances 66 in memory 62, each of which corresponds to a VRF provisioned in network device 50. In an embodiment, a VRF instance stores various types of information such as: an own VNI 70 assigned to the network device, one or more imported D-VNIs 72, and one or more local VNIs 74 (which the network device exports). In inter-domain VXLAN tunnels, VTEP 50 uses D-VNIs imported from a remote VTEP for encapsulating packets destined to the remote VTEP. A remote VTEP uses exported local VNIs 74 received from VTEP 50 as D-VNIs in encapsulating packets destined to VTEP 50. An exported local VNI 74 may comprise, for example, the same value as own VNI 70.

VRF instance 66 further comprises a Forwarding Information Base (FIB) 76 comprising multiple route entries 78. In some embodiments, the FIB is implemented in hardware but controlled by control plane program 64. In some embodiments, packet processor 54 looks up a packet in route entries of the FIB to find a route entry specifying how the packet should be forwarded. In an embodiment, packet lookup in FIB 76 is typically based on information in the packet's header, e.g., IP addresses and prefixes.

In the present example, a route entry comprises at least an egress Routing Interface (RIF) and next-hop information. The route entry may additionally store vendor-specific information. An egress RIF comprises a logical interface representing a routable interface that may comprise a physical port, a sub-interface, a Switch Virtual Interface (SVI), an L3VNI or any other suitable type of interface. In some embodiments, a VNI or a D-VNI may be derived from an egress RIF and used for VXLAN encapsulation.

In an embodiment, VTEP 50 stores egress RIFs in a RIF table 80 in memory 62. In this embodiment, route entries 78 in FIB 76 point to respective egress RIFs in the RIF table, wherein multiple different route entries may point to a common egress RIF.

In some embodiments VTEP 50 creates a unique egress RIF for each imported D-VNI and stores the unique egress RIF in RIF table 80. In some embodiments, VTEP 50 also creates a unique egress RIF for each local VNI 74 and stores the unique egress RIF in RIF table 80. The exported local VNIs are associated with the same egress RIFs created for the local VNIs.

Next-hop information in a route entry 78 typically specifies an IP address of the next network device to be traversed along the path to the destination.

In some embodiments, control program 64 creates a unique Forwarding Identifier (FID) for each imported D-VNI and for each local VNI (in addition to the unique egress-RIF), wherein the FID is mapped into the imported D-VNI of this unique egress RIF. In such embodiments, FIB 76 provides a route entry pointing to an egress RIF, which in turn points to the FID that maps to the imported D-VNI of the egress RIF. In an embodiment, the packet processor derives an imported D-VNI for a packet using a chain of operations: FIB lookup->egress RIF->FID->imported D-VNI. Since only a single FID is allocated per each imported D-VNI, the FIDs consume little storage area.

In some embodiments, VTEP 50 comprises one or more instances of a gateway protocol 84 such as, for example, the Border Gateway Protocol (BGP). For example, VTEP 50 may allocate a dedicated BGP instance per each VRF provisioned in the VTEP. In some embodiments VTEP 50 uses BGP(s) 84 for exchanging routing information such as VNIs and RTs with other VTEPs.

In some embodiments, control program 64 provisions one or more route entries in forwarding rules in an Access Control List (ACL). In such embodiments, packet processor 54 looks up a packet by matching the packet to one of the forwarding rules in the ACL.

Packet Processing in a Network Device Serving as a VTEP

FIGS. 3A and 3B are diagrams that schematically illustrate VTEP processing and forwarding applied to non-encapsulated and encapsulated packets, in accordance with embodiments that is described herein.

FIG. 3A depicts processing in a packet processor 100. The same or similar processing may be executed, for example, by packet processor 54 of VTEP 50.

Packet processor 100 receives an input packet 104 that is not encapsulated. In computing system 20, input packet 104 may originate, for example, from a host 28A, 28B or 28C, a serving host such as a DNS host 24A (DN1 or DN2), or a storage host 24B (ST1 or ST2). In the present example, input packet 104 is destined to a VRF that is not provisioned in the VETP of packet processor 100 and therefore needs to be encapsulated with a suitable imported D-VNI.

At a lookup stage 106, packet processor 100 identifies the VRF from which the input packet originates and looks up the input packet in a FIB (76) of the identified VRF. For example, assuming the input packet originated from host H11 of the PINK VEF, packet processor 100 looks up the input packet in a FIB of the PINK VRF to which host H11 belongs. A successful lookup operation results in a route entry 78 specifying an egress RIF. In this example, the egress RIF comprises a unique egress RIF assigned to an imported D-VNI.

In an adjacency stage 110, packet processor 100 generates next-hop information from the route entry or the egress RIF of stage 106. In a mapping stage 112 packet processor 100 derives the imported D-VNI associated with the egress RIF of stage 106, and in a rewrite stage 114 generates from input packet 104 an output packet 120 that is VXLAN encapsulated with the imported D-VNI of stage 112. Packet processor 100 forwards the output packet in accordance with the egress RIF of stage 106.

FIG. 3B depicts processing in a packet processor 150. The same or similar processing may be executed, for example, by packet processor 54 of VTEP 50.

Packet processor 150 receives an input packet 154 that is encapsulated with a VNI previously exported to a remote VTEP. The exported VNI is used by the remote VTEP as a D-VNI for encapsulating packets destined to the VTEP comprising packet processor 150.

Packet processor 150 decapsulates input packet 154 (stage 156), selects a destination VRF based on the VNI with which the input packet is VXLAN encapsulated, and looks up the decapsulated packet (stage 158) in a FIB 76 of the selected VRF).

In some embodiments, packet processor 150 terminates the VXLAN tunnel via which input packet 154 has arrived.

In this case, the lookup operation of stage 158 results in a regular egress RIF that is not associated with a D-VNI. In an adjacency stage 160, the packet processor generates next-hop information. In a rewrite stage 162 packet processor 154 generates an output packet 164A that is not encapsulated, and routes the output packet in accordance with the egress RIF of stage 158.

In some embodiments, the VTEP comprising packet processor 154 serves as a mediator VTEP that mediates communication between different routing domains. A hub-spoke topology comprising mediator VTEPs will be described with reference to FIG. 5 below.

When operating as a mediator VTEP, packet processor 154 exports a local VNI (74) to the source VTEP and imports a D-VNI (72) from the destination VTEP. Packet processor 154 receives input packet 154 from the source VTEP and processes the packet in stages 156 and 158, resulting in an egress RIF as described above.

In FIG. 3B, processing related to a mediator VTEP is depicted in dotted lines. In response to identifying that the egress RIF is uniquely associated with a D-VNI (the D-VNI imported from the destination VTEP), packet processor 154 maps the unique egress RIF into the imported D-VNI (stage 170). In rewrite stage 162, packet processor 154 re-encapsulates the packet with the D-VNI imported from the destination VTEP, resulting in an output packet 164B. Packet processor 154 then routes output packet 164B in accordance with the egress RIF of stage 158.

It is noted that although FIGS. 3A and 3B depict different packet processing flows, a VTEP (e.g., VTEP 50) typically implements both packet processing flows of packet processors 100 and 150, in an embodiment.

Control-Plane Processing

Figure 4:
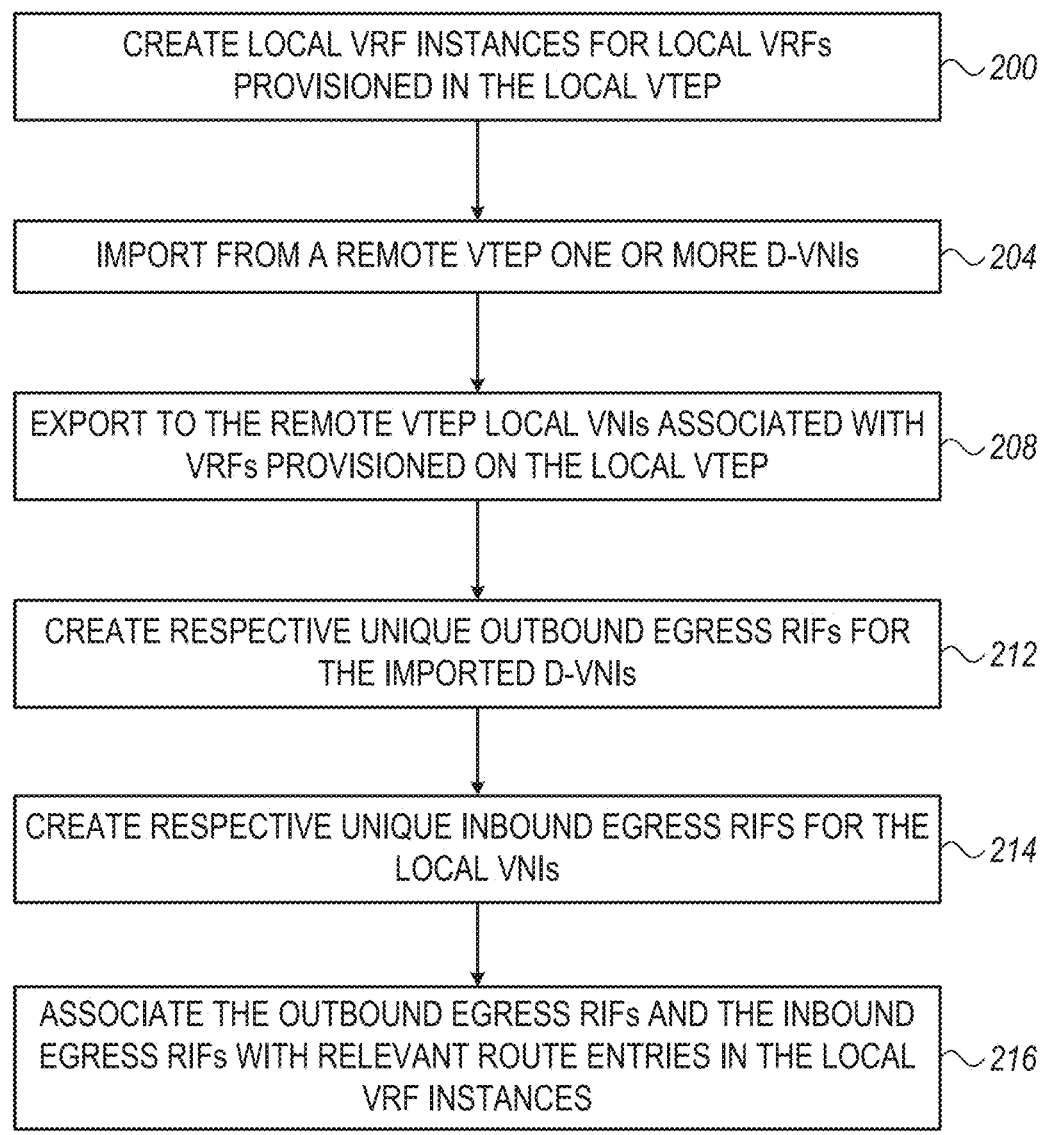
FIG. 4 is a flow chart that schematically illustrates a method for configuring a VTEP for communication with a remote VTEP, in accordance with an embodiment that is described herein.

FIG. 4 is a flow chart that schematically illustrates a method for configuring a VTEP for communication with a remote VTEP, in accordance with an embodiment that is described herein.

The method of FIG. 4 will be described as executed by control program 64 running on CPU 60 of VTEP 50, denoted herein as a local VTEP.

The method begins at a VRF instance creation step 200, with control program 64 creating one or more VRF instances for respective one or more local VRFs provisioned in the local VTEP.

At an import step 204, the control program imports from the remote VTEP one or more D-VNIs (72). In the present example, each of the imported D-VNIs is associated with a respective remote VRF provisioned in the remote VTEP but not in the local VTEP.

At an export step 208, the control program exports to the remote VTEP one or more local VNIs (74) that are respectively associated with the local VRFs provisioned in the local VTEP, and are to be used by the remote VTEP as D-VNIs in encapsulating packets destined to the local VTEP.

At an outbound RIF creation step 212, the control program creates respective unique egress RIFs for the imported D-VNIs, so that each D-VNI is deducible from its unique outbound egress RIF. At an inbound RIF creation step 214, the control program creates respective unique inbound egress RIFs for the local VNIs (these egress RIFs are used also for the respective exported local VNIs in the inbound direction), so that each exported local VNI is deducible from its unique inbound egress RIF.

At a RIF association step 216, the control program associates the outbound egress RIFs of step 212 and the inbound egress RIFs of step 214 with relevant route entries in VRF instances of respective local VRFs. In some embodiments, the control program associates a unique egress RIF with multiple route entries that respectively belong to multiple VRF instances created respectively for multiple local VRFs provisioned in the local VTEP. Following step 216, the local VTEP is ready for handling communication between the local VRFs in the local VTEP and the remote VRFs in the remote VTEP.

A Computer System Having a Hub-Spoke Network Topology

Figure 5:
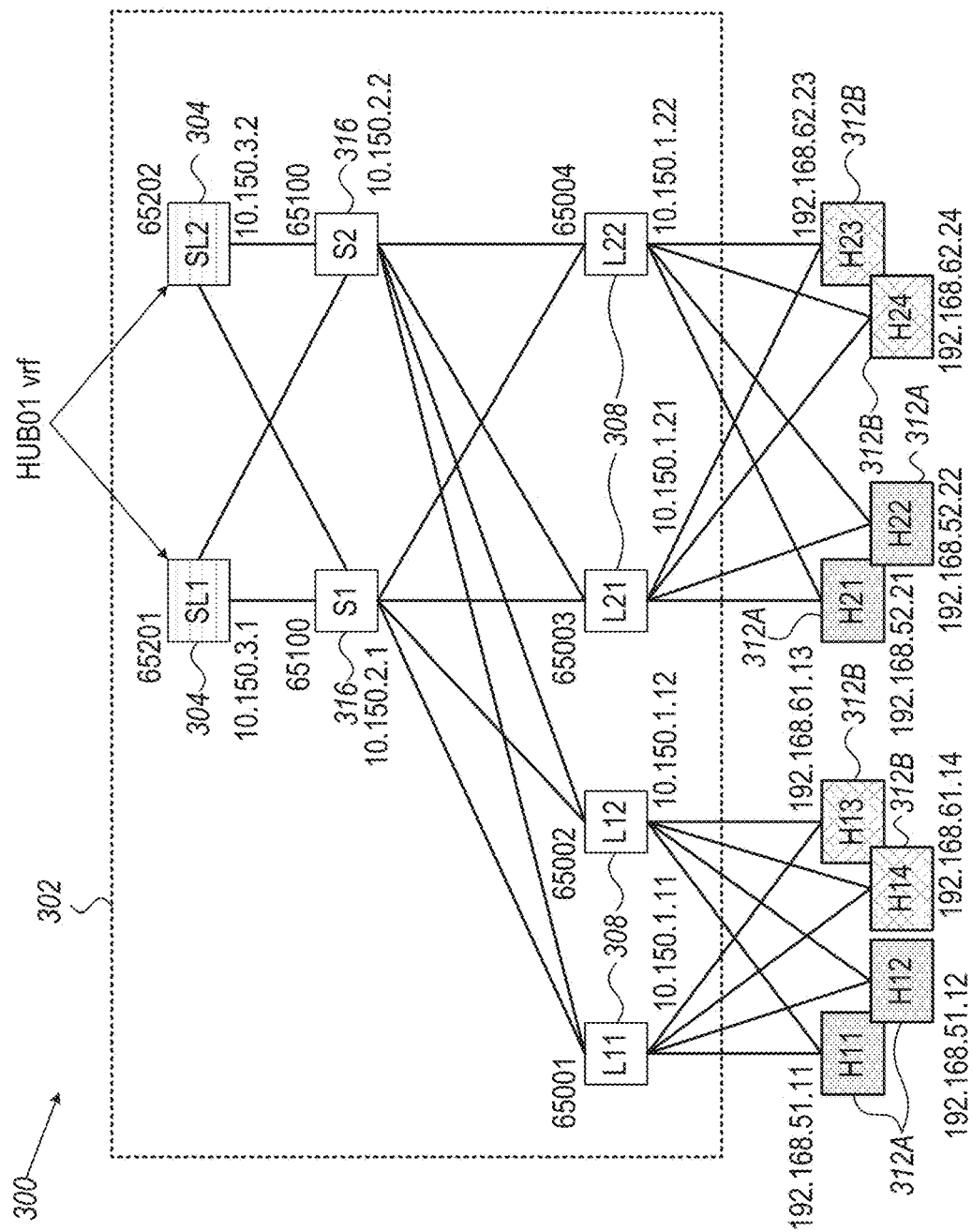
FIG. 5 is a block diagram that schematically illustrates a computer system having a hub-spoke topology, in accordance with an embodiment that is described herein.

FIG. 5 is a block diagram that schematically illustrates a computer system 300 having a hub-spoke topology, in accordance with an embodiment that is described herein.

In a hub-spoke network topology, a hub routing domain serves as a central point of connectivity for multiple other routing domains (spokes).

Computer system 300 supports multiple routing domains (VRFs) denoted PINK, BLUE and HUB01, which are assigned respective L3VNI values 10001, 10002 and 20001.

Computer system 300 comprises a communication network 302 in which multiple network devices are interconnected, including hub switches (also referred to as hub VTEPs) 304 denoted SL1 and SL2, leaf switches (also referred to as Leaf VTEPs) 308 denoted L11 ... L22, and spine switches 316 denoted S1 and S2. In computer system 300, hub VTEPs 304 serve as mediator VTEPs that mediate communication between different VRFs provisioned in leaf VTEPs 308.

In communication network 302, leaf switches L11 ... L22 are coupled to hosts 312A and 312B on one side, and to spine switches 316 (S1 and S2) on the other side. In addition, each of the spine switches S1 and S2 is coupled to both hub switches SL1 and SL2 on one side and to the leaf switches on the other side.

In the present example, the HUB01 VRF is provisioned in each of the hub VTEPs SL1 and SL2, whereas the PINK and BLUE VRFs are both provisioned in each of the leaf VTEPs L11 ... L22. In general, each leaf VTEP 308 is provisioned with the VRFs of hosts 312A and 312B that are coupled to that leaf VTEP.

In some embodiments, computer system 300 supports communication between different VRFs using D-VNI techniques. To this end, VTEPs provisioned with different VRFs may establish VXLAN-based communication by exchanging VNIs with one another.

In the example of FIG. 5, each of hub VTEPs SL1 and SL2 imports from each of leaf VTEPs L1/ ... L22 a D-VNI for the PINK VRF, and another D-VNI for the BLUE VRF. In addition, each of leaf VTEPs L11 ... L22 imports from SL1 and SL2 a D-VNI for the HUB01 VRF.

Consider a source leaf VTEP sending a packet to a destination leaf VTEP via a hub VTEP. The source VTEP encapsulates the packet with the D-VNI imported from the hub VTEP and tunnels the encapsulated packet to the hub VTEP. Based on the D-VNI in the received packet, the hub VTEP re-encapsulates the packet with the D-VNI that the hub VTEP imported from the destination VTEP.

In some embodiments, computer system 300 supports VXLAN tunneling with D-VNIs with low storage footprint, as described above, e.g., with reference to FIG. 1 above. In such embodiments, the leaf and hub VTEPs in computer system 300 create unique egress RIFs for the imported D-VNIs and store the unique egress RIFs only once in the VTEP.

In computer system 300, hosts 312A and 312B that are coupled to a common leaf switch but belong to different VRFs, may also communicate using D-VNIs via hub switches SL1 and SL2. For example, even though both H11 of the PINK VRF and H13 of the BLUE VRF are coupled to leaf switch L11, hosts H1/ and H13 communicate with one another via the mediator VTEPs SL1 and SL2, as described above.

In some embodiments, communication in the hub-spoke topology using VXLAN tunneling with D-VNIs involves the following stages:

Each of the hub VTEPs SL1 and SL2 imports from the leaf VTEPs routes (e.g., using RTs as described above) to the PINK and BLUE VRFs. For example, a hub VRF instance of the HUB01 VRF of SL1 or SL2 imports RTs *:10001 and *:10002 from the leaf VTEPs. For example, each of SL1 and SL2 imports from L11 and L12 routes comprising the IP addresses of hosts H11 ... H14, and from L21 and L22 routes comprising the IP addresses of H21 ... H24.

Each of SL1 and SL2 aggregates the imported routes into an aggregated route and originates the aggregated route for the PINK VRF routes with the export RT 65201:10002 (or 65202:10002). Similarly, SL1 and SL2 originate the aggregated route for the BLUE VRF routes with the export RT 65201:10001 (or 65201:10001). In some embodiments, SL1 or SL2 generates an aggregated route by applying a Longest Prefix Match (LPM) method to imported routes represented by IP addresses of hosts 312A and 312B. For example, SL1 and SL2 generate an aggregated route 192.168.62.0/24 for the PINK VRF in L11, for reaching H23 and H24 of the BLUE VRF, via L21 or L22).

Leaf VTEPs L11 ... L22 use their auto-derived RTs for route export and import. This means that the leaf VTEPs import the aggregated routes from SL1 and SL2, to be used for inter-VRF routing via the hub VTEPs, e.g., between H11 (PINK VRF) and H24 (BLUE VRF).

Consider a host in the PINK VRF sending a packet to a host in the BLUE VRF. For example, H11 (IP 192.168.51.11) sends a packet to H24 (IP 192.168.62.24). The packet is received by a L11 or L12, which forwards the packet using the aggregated route 192.168.62.0/24 previously originated from SL1 and/or SL2. L11 or L22 encapsulates the packet with D-VNI 20001 of the HUB01 VRF, and tunnels the encapsulated packet over to hub VTEP SL1 or SL2. SL1 or SL2 decapsulates the packet and routes the decapsulated packet in the HUB01 VRF, based on the full host route (e.g., 192.168.62.24/32 of host H24) that was imported from L21 and/or L22. SL1 or SL2 re-encapsulates the packet with VNI 10002 (imported from L21 and/or L22) and tunnels the re-encapsulated packet over VXLAN to L21 or L22. L21 or L22 then routes the packet in the BLUE VRF (e.g., to H24 in this example). A similar forwarding scheme applies for communication between hots of different VRFs, wherein the hosts are coupled to a common leaf VTEP (e.g., H11 and H13).

A Multi-Site Computer System

Figure 6:
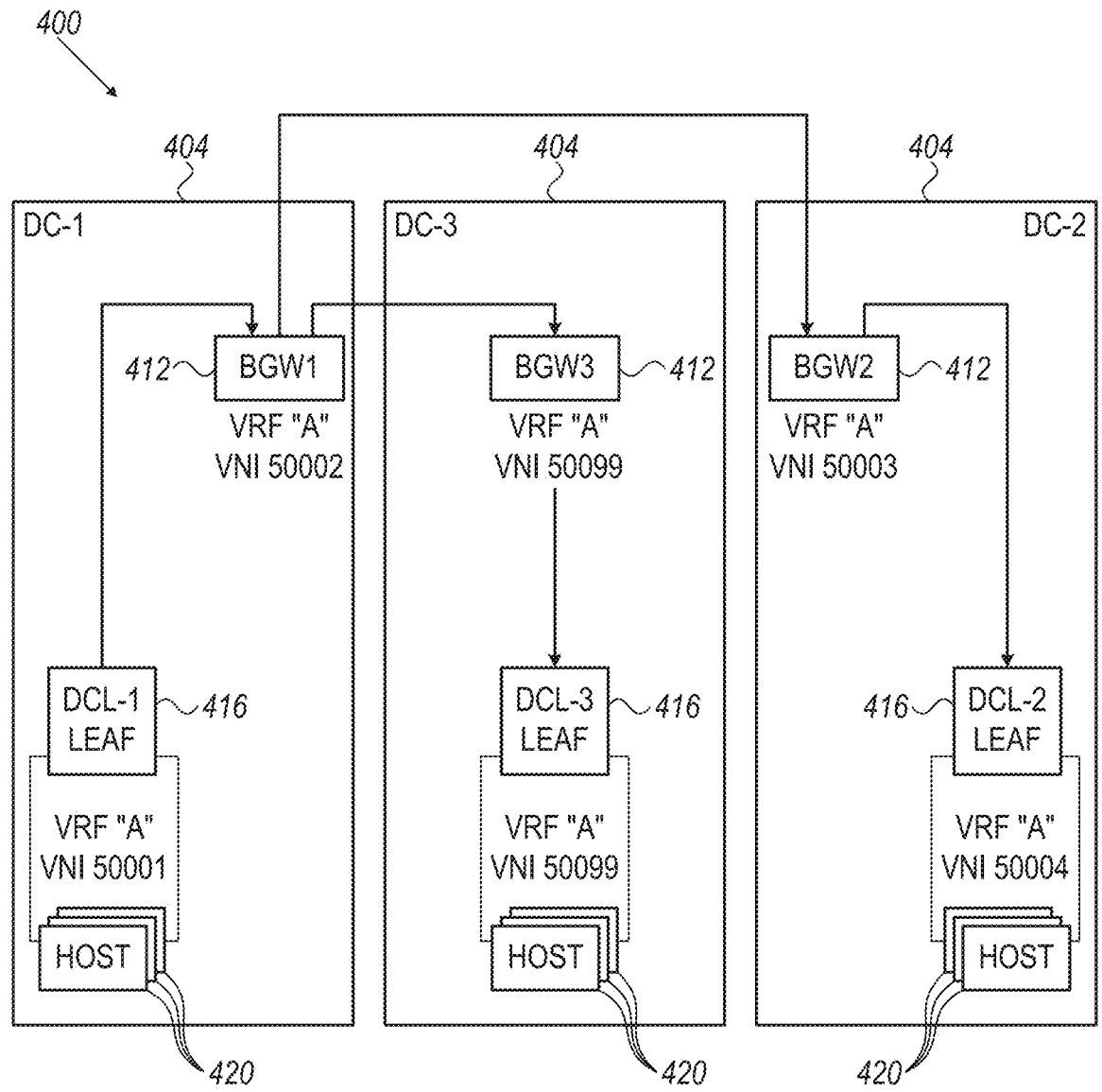
FIG. 6 is a diagram that schematically illustrates a multi-site computer system, in accordance with an embodiment that is described herein.

FIG. 6 is a diagram that schematically illustrates a multi-site computer system 400, in accordance with an embodiment that is described herein. The computer system in FIG. 6 may be used, for example, in implementing a multi-site data center whose sites may be deployed in different geographical location and/or with different administrative domains.

In the present example, computer system 400 comprises Data Center (DC) sites 404 denoted DC-1, DC-2 and DC-3, which may be managed separately by different network managers. In alternative embodiments, the multi-site computer system may comprise other suitable numbers of sites. In some embodiments, DC sites 404 are associated with different respective routing domains.

Each of DC sites 404 comprises a Border Gateway (BGW) router (also referred to as a BGW VTEP) 412 that locally connects to one or more leaf switches (also referred to as leaf VTEPs) 416 of the DC site. The BGW VTEPs in DC sites DC-1, DC-2 and DC-3 are denoted BGW1, BGW2, and BGW3, respectively. In some embodiments, BGW VTEPs 412 serve as mediator VTEPs that mediate communication between DC sites having different routing domains.

In some embodiments, BGW VTEPs 412 and leaf VTEPs 416 are implemented using VTEP 50 of FIG. 2, and process packets as described in FIGS. 3A and 3B above.

Leaf VTEPs 416 in DC sites DC-1, DC-2 and DC-3 are denoted DCL-1, DCL-2 and DCL-3, respectively. For the sake of clarity, FIG. 6 depicts only one leaf VTEP in each DC site. Each DC site 404 typically comprises hosts 420 that are accessible via the leaf VTEPs of the DC site. In some embodiments, BGW VTEPs 412 and hosts 420 share a common VRF denoted "A".

In the present example, BGW1, BGW2 and BGW3 are assigned respective VNIs 50002, 50003 and 50099, and leaf VTEPs DCL-1, DCL-2 and DCL-3 are assigned respective VNIs 50001, 50004 and 50099. The VNI allocation in the DC-1 and DC-2 sites is asymmetrical (because the BGW VTEP is assigned a different VNI than the leaf switches in the DC site) whereas the VNI allocation in the DC-3 site is symmetrical (because the BGW VTEP and leaf VTEPs share a common VNI value 50099 in this DC site).

In the example of FIG. 6, leaf VTEP DCL-1 in site DC-1 is required to send packets to leaf VTEP DCL-2 in site DC-2. Such inter-domain communication may be achieved using VXLAN tunneling with D-VNIs.

In an example scenario, a host behind leaf VTEP DCL-1 sends packets to another host behind leaf VTEP DCL-2. To support this scenario, DCL-1 imports D-VNI 50002 from BGW1, BGW1 imports D-VNI 50003 from BGW2, and BGW2 imports VNI 50004 from DCL-2. A packet sent from DCL-1 to DCL-2 will be encapsulated with D-VNI 50002 and tunneled to BGW1. BGW1 decapsulates the packet, re-encapsulates it with D-VNI 50003, and tunnels the packet to BGW2. BGW2 decapsulates the packet, re-encapsulates it with D-VNI 50004, and tunnels the packet to leaf DCL-2. As a final terminating leaf VTEP, DCL-2 decapsulates the packet and forwards the decapsulated packet to the destination host behind DCL-2.

In another example scenario, a host behind leaf VTEP DCL-1 sends packets to a host behind leaf VTEP DCL-3. To support this scenario, DCL-1 imports VNI 50002 from BGW1, and BGW1 imports VNI 50099 from the BGW3. A packet sent from a host behind DCL-1 to another host behind DCL-3 will be processes as described is the previous scenario up to BGW1. In the present scenario, BGW1 re-encapsulates the packet with D-VNI 50099 and tunnels the packet to BGW3. BGW3 forwards the packet via DCL-3 to the destination host behind DCL-3 based on VNI 50099.

As noted above, VNI allocation in site DC-3 is symmetrical, meaning that no D-VNI is required for communication within site DC-3. For sending packets from site DC-3 to DC-1 or DC-2, however, BGW3 needs to import D-VNI 50002 from BGW1 or D-VNI 50003 from BGW2, respectively.

In some embodiments, computer system 400 supports VXLAN tunneling with D-VNIs with low storage footprint, as described above, e.g., with reference to FIG. 1. In such embodiments, the VTEPs in computer system 400 create unique egress RIFs for the imported D-VNIs and store the unique egress RIFs only once in the VTEP.

The configurations of computer system 20 of FIG. 1, computer system 300 of FIG. 5, and computer system 400 of FIG. 6, as well as the configuration of network device (VTEP) 50 of FIG. 2 are example configurations, which are chosen purely for the sake of conceptual clarity. In alternative embodiments, any other suitable computer system and network device configurations can also be used. Elements that are not necessary for understanding the principles of the present invention, such as various interfaces, addressing circuits, timing and sequencing circuits and debugging circuits, have been omitted from the figure for clarity.

Some elements of network device (VTEP) 50, such as packet processor 54 may be implemented in hardware, e.g., in one or more Application-Specific Integrated Circuits (ASICs) or FPGAs. Additionally or alternatively, packet processor 54 can be implemented using software, or using a combination of hardware and software elements. Memory 62 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of CPU 60 and/or packet processor 54, may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used.

The embodiments described above, routes/VNIs are imported and exported mainly using the BGP protocol. In alternative embodiments, however, routes/VNIs may be configured in network devices by a user of the communication network. In an example embodiment, a network device imports a D-VNI by receiving the D-VNI in one or more commands originating from a user, wherein the user sends the one or more commands manually, or automatically by running a script (or scripts) containing the one or more commands.

The embodiments described above refer mainly to layers specified in the OSI model. This, however, is not mandatory, and in alternative embodiments layers in accordance with any other suitable layering model can also be used. Such alternative layering model is assumed to include a transport layer and an IP layer similar to those specified in the OSI model.

Although the embodiments described herein mainly address storage-efficient implementation of D-VNIs in network devices such as switches and routers, the methods and systems described herein can also be used in other applications, such as in implementing D-VNIs with a small storage space in a network adapter such as a NIC or a smart NIC.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data communication, comprising:
   in a network device serving as a local Virtual Extensible Local Area Network (VXLAN) Tunnel Endpoint (VTEP), communicating between local Virtual Routing and Forwarding domains (VRFs) and remote VRFs, wherein each of the local VRFs and each of the remote VRFs has a unique VXLAN Identifier (VNI);
   creating, by a control program, a local VRF instance for a local VRF that is provisioned in the local VTEP;
   importing a Downstream-VNI (D-VNI) to be used in forwarding packets from the local VRF to a remote VRF, the remote VRF being provisioned in the remote VTEP but not in the local VTEP;
   creating, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI;
   associating the unique egress RIF with one or more route entries in the local VRF instance;
   receiving, by a packet processor of the local VTEP, a packet destined to the remote VRF;
   looking up the packet in the one or more route entries in the local VRF instance to retrieve the unique egress RIF, translating the unique egress RIF into the unique FID, mapping the unique FID onto the imported D-VNI, and encapsulating the packet with the imported D-VNI; and
   forwarding the encapsulated packet in accordance with the unique egress RIF.

2. The method according to claim 1, and comprising:
   exporting a local VNI of the local VRF to the remote VTEP, to be used by the remote VTEP in forwarding packets from the remote VRF to the local VRF, creating a second egress RIF for the local VNI, and associating the second egress RIF with one or more second route entries in the local VRF instance;
   receiving from the remote VRF a second packet destined to the local VRF, the second packet is encapsulated by the remote VTEP with the exported local VNI;
   decapsulating the second packet and looking up the decapsulated packet in the one or more second route entries in the local VRF instance, for retrieving the second egress RIF; and
   forwarding the second packet in accordance with the second egress RIF.

3. The method according to claim 1, wherein the local VTEP and the remote VTEP are comprised in an Ethernet Virtual Private Network (EVPN) in which packets communicated between different VRFs are encapsulated based on VXLAN encapsulation.

4. The method according to claim 1, wherein importing the D-VNI comprises importing the D-VNI using an instance of a Border Gateway Protocol (BGP) associated with the local VRF.

5. The method according to claim 1, wherein associating the unique egress RIF comprises associating the unique egress RIF with multiple route entries that respectively belong to multiple VRF instances created respectively for multiple local VRFs provisioned in the local VTEP.

6. The method according to claim 1, and comprising provisioning the one or more route entries in forwarding rules in an Access Control List (ACL), and wherein looking up the packet comprises matching the packet to one of the forwarding rules in the ACL.

7. The method according to claim 1, wherein each of the local VTEP and the remote VTEP comprises a leaf network device or a service network device in the communication network, and wherein each of the leaf network devices is assigned one or more local VRFs, and each of the service network devices is assigned one or more remote VRFs that are different from the local VRFs.

8. The method according to claim 7, wherein a serving host is coupled to a given service network device on which a corresponding shared-service VRF is provisioned, and wherein the serving host provides a service to one or more served hosts in the local VRFs over the communication network.

9. The method according to claim 7, wherein the communication network has a hub-spoke topology, in which one or more hub network devices are provisioned with a hub VRF supporting routing between served hosts belonging to different VRFs among the local VRFs.

10. The method according to claim 1, wherein the communication network supports an Equal-Cost Multi-Path (ECMP) routing protocol, and wherein the method further comprises encapsulating packets forwarded to multiple remote VTEPs using different ECMP paths, with different respective D-VNIs.

11. The method according to claim 1, wherein receiving the packet comprises receiving the packet from a host or a network element in the first VRF, or from a third VRF.

12. The method according to claim 1, wherein importing the D-VNI comprises importing the D-VNI from the remote VTEP, or by receiving the D-VNI in one or more commands sent by a user manually, or automatically by running a script containing the one or more commands.

13. A method for data communication, comprising:
   in a network device serving as a local Virtual Extensible Local Area Network (VXLAN) Tunnel Endpoint (VTEP), communicating with one or more remote VTEPs, wherein the local VTEP and the one or more remote VTEPs are assigned respective VXLAN Identifiers (VNIs);
   importing, by a control program running on the local VTEP, a Downstream-VNI (D-VNI) to be used in forwarding packets from the local VTEP to a remote VTEP;
   creating, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI;
   associating the unique egress RIF with one or more route entries in the local VTEP;
   receiving, by a packet processor of the local VTEP, a packet destined to the remote VTEP;

looking up the packet in the one or more route entries in the local VTEP to retrieve the unique egress RIF, translating the unique egress RIF into the unique FID, mapping the unique FID onto the imported D-VNI, and encapsulating the packet with the imported D-VNI; and forwarding the encapsulated packet in accordance with the unique egress RIF.

14. The method according to claim 13, and comprising:

exporting a local VNI of the local VTEP to the remote VTEP, to be used by the remote VTEP in forwarding packets from the remote VTEP to the local VTEP, creating a second egress RIF for the local VNI, and associating the second egress RIF with one or more second route entries in the local VTEP;

receiving from the remote VTEP a second packet destined to the local VTEP, the second packet is encapsulated by the remote VTEP with the exported local VNI;

decapsulating the second packet, and looking up the decapsulated packet in the one or more second route entries for retrieving the second egress RIF; and forwarding the second packet in accordance with the second egress RIF.

15. The method according to claim 13, wherein the local VTEP and the one or more remote VTEPs belong to different respective sites in a multi-site topology.

16. The method according to claim 13, wherein the local VTEP serves as a Border Gateway (BGW) VTEP and the one or more remote VTEPs serve as leaf VTEPs coupled to hosts, and wherein the BGW VTEP and the hosts are assigned a common Virtual Routing and Forwarding domain (VRF).

17. The method according to claim 13, wherein the local VTEP and the remote VTEP are assigned different respective VNIs.

18. The method according to claim 13, wherein the network device is comprised in a communication network comprising multiple interconnected network devices, and wherein the network device serves as a leaf VTEP or a BGW VTEP in the communication network.

19. A method for communication between Virtual Routing and Forwarding domains (VRFs), the method comprising:

communicating between a local VRF provisioned in a local VXLAN Tunnel Endpoint (VTEP) and a remote VRF, the remote VRF being provisioned in a remote VTEP but not in the local VTEP;

importing, by the local VTEP, a Downstream VXLAN Identifier (D-VNI) associated with the remote VRF, to be used in forwarding packets from the local VRF to the remote VRF, and creating, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI; and upon receiving by the local VTEP, a packet destined to the remote VRF, translating the unique egress RIF retrieved based on the packet into the unique FID, mapping the unique FID onto the imported D-VNI, and encapsulating the packet with the imported D-VNI; and forwarding the encapsulated packet in accordance with the unique egress RIF.

20. A method for communication between sites of different routing domains, the method comprising:

communicating between a local VXLAN Tunnel Endpoint (VTEP) and a remote VTEP belonging to different respective routing domains;

importing, by the local VTEP, a Downstream-VNI (D-VNI) to be used in forwarding packets from the local VTEP to the remote VTEP, and creating, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI;

upon receiving by the local VTEP, a packet destined to the remote VTEP, translating the unique egress RIF retrieved based on the packet into the unique FID, mapping the unique FID onto the imported D-VNI, and encapsulating the packet with the imported D-VNI; and forwarding the encapsulated packet in accordance with the unique egress RIF.

21. A network device serving as a local Virtual Extensible Local Area Network (VXLAN) Tunnel Endpoint (VTEP), the network device comprising:

a communication interface, configured to communicate between local Virtual Routing and Forwarding domains (VRFs) and remote VRFs, wherein each of the local VRFs and each of the remote VRFs has a unique VXLAN Identifier (VNI);

a first processor running a control program, the control program configured to:

create a local VRF instance for a local VRF that is provisioned in the local VTEP;

import a Downstream-VNI (D-VNI) to be used in forwarding packets from the local VRF to a remote VRF, the remote VRF being provisioned in a remote VTEP but not in the local VTEP;

create, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI; and associate the unique egress RIF with one or more route entries in the local VRF instance; and a packet processor configured to:

receive a packet destined to the remote VRF;

lookup the packet in the one or more route entries in the local VRF instance to retrieve the unique egress RIF, translate the unique egress RIF into the unique FID, map the unique FID onto the imported D-VNI, and encapsulate the packet with the imported D-VNI; and forward the encapsulated packet in accordance with the unique egress RIF.

22. The network device according to claim 21, wherein the control program in the local VTEP is configured to:

export a local VNI of the local VRF to the remote VTEP, to be used by the remote VTEP in forwarding packets from the remote VRF to the local VRF; and create a second egress RIF for the local VNI, and associate the second egress RIF with one or more second route entries in the local VRF instance; and the packet processor is configured to:

receive from the remote VRF, via the communication interface, a second packet destined to the local VRF, the second packet is encapsulated by the remote VTEP with the exported local VNI;

decapsulate the second packet;

lookup the decapsulated packet in the one or more second route entries in the local VRF instance, for retrieving the second egress RIF; and forward the second packet in accordance with the second egress RIF.

23. The network device according to claim 21, wherein the local VTEP and the remote VTEP are comprised in an Ethernet Virtual Private Network (EVPN) in which packets communicated between different VRFs are encapsulated based on VXLAN encapsulation.

24. The network device according to claim 21, wherein the control program is configured to import the D-VNI using an instance of a Border Gateway Protocol (BGP) associated with the local VRF.

25. The network device according to claim 21, wherein the control program is configured to associate the unique egress RIF with multiple route entries that respectively belong to multiple VRF instances created respectively for multiple local VRFs provisioned in the local VTEP.

26. The network device according to claim 21, wherein the control program is configured to provision the one or more route entries in forwarding rules in an Access Control List (ACL), and wherein the packet processor is configured to lookup the packet by matching the packet to one of the forwarding rules in the ACL.

27. The network device according to claim 21, wherein each of the local VTEP and the remote VTEP comprises a leaf network device or a service network device in the communication network, and wherein each of the leaf network devices is assigned one or more local VRFs, and each of the service network devices is assigned one or more remote VRFs that are different from the local VRFs.

28. The network device according to claim 27, wherein a serving host is coupled to a given service network device on which a corresponding shared-service VRF is provisioned, and wherein the serving host provides a service to one or more served hosts in the local VRFs over the communication network.

29. The network device according to claim 27, wherein the communication network has a hub-spoke topology, in which one or more hub network devices are provisioned with a hub VRF supporting routing between served hosts belonging to different VRFs among the local VRFs.

30. The network device according to claim 21, wherein the communication network supports an Equal-Cost Multi-Path (ECMP) routing protocol, and wherein the packet processor is configured to encapsulate packets forwarded to multiple remote VTEPs using different ECMP paths, with different respective D-VNIs.

31. The network device according to claim 21, wherein the packet processor is configured to receive the packet from a host or a network element in the first VRF, or from a third VRF.

32. The network device according to claim 21, wherein the control program is configured to import the D-VNI from the remote VTEP, or by receiving the D-VNI in one or more commands sent by a user manually, or automatically by running a script containing the one or more commands.

33. A network device serving as a local Virtual Extensible Local Area Network (VXLAN) Tunnel Endpoint (VTEP), the network device comprising:
 a communication interface, configured to communicate with one or more remote VTEPs, wherein the local VTEP and the one or more remote VTEPs are assigned respective VXLAN Identifiers (VNIs);
 a first processor running a control program, the control program configured to:
  import a Downstream-VNI (D-VNI) to be used in forwarding packets from the local VTEP to a remote VTEP;
  create, for the imported D-VNI, (i) a unique egress Routing Interface (RIF) and (ii) a unique Forwarding Identifier (FID), wherein the unique RIF is translatable into the unique FID, and the unique FID is mapped onto the imported D-VNI; and
  associate the unique egress RIF with one or more route entries in the local VTEP; and
 a packet processor configured to:
  receive a packet destined to the remote VTEP;
  lookup the packet in the one or more route entries in the local VTEP to retrieve the unique egress RIF, translate the unique egress RIF into the unique FID, map the unique FID onto the imported D-VNI, and encapsulate the packet with the imported D-VNI; and
  forward the encapsulated packet in accordance with the unique egress RIF.

34. The network device according to claim 33, wherein the control program is configured to:
 export a local VNI of the local VTEP to the remote VTEP, to be used by the remote VTEP in forwarding packets from the remote VTEP to the local VTEP; and
 create a second egress RIF for the local VNI and associate the second egress RIF with one or more second route entries in the local VTEP; and
 the packet processor is configured to:
  receive from the remote VTEP, via the communication interface, a second packet destined to the local VTEP, the second packet is encapsulated by the remote VTEP with the exported local VNI;
  decapsulate the second packet;
  lookup the decapsulated packet in the one or more second route entries for retrieving the second egress RIF; and
  forward the second packet in accordance with the second egress RIF.

35. The network device according to claim 33, wherein the local VTEP and the one or more remote VTEPs belong to different respective sites in a multi-site topology.

36. The network device according to claim 33, wherein the local VTEP serves as a Border Gateway (BGW) VTEP and the one or more remote VTEPs serve as leaf VTEPs coupled to hosts, and wherein the BGW VTEP and the hosts are assigned a common Virtual Routing and Forwarding domain (VRF).

37. The network device according to claim 33, wherein the local VTEP and the remote VTEP are assigned different respective VNIs.

38. The network device according to claim 33, wherein the network device is comprised in a communication network comprising multiple interconnected network devices, and wherein the network device serves as a leaf VTEP or a BGW VTEP in the communication network.

\* \* \* \* \*